(12) United States Patent
Niitsuma

(10) Patent No.: US 6,751,550 B2
(45) Date of Patent: Jun. 15, 2004

(54) NAVIGATION APPARATUS

(75) Inventor: Eiichi Niitsuma, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 2 days.

(21) Appl. No.: 10/201,555

(22) Filed: Jul. 22, 2002

(65) Prior Publication Data

US 2003/0028320 A1 Feb. 6, 2003

(30) Foreign Application Priority Data

Jul. 23, 2001 (JP) ........................................ 2001-221038

(51) Int. Cl.$^7$ ............................................... G01C 21/00
(52) U.S. Cl. ...................................... 701/210; 701/209
(58) Field of Search ................................ 701/200, 201, 701/207, 209, 210, 211; 340/988, 992, 995.1, 995.19; 342/350

(56) References Cited

U.S. PATENT DOCUMENTS

| | | | |
|---|---|---|---|
| 5,311,434 A | * | 5/1994 | Tamai ........................ 701/210 |
| 5,652,706 A | | 7/1997 | Morimoto et al. |
| 6,026,346 A | | 2/2000 | Ohashi et al. |
| 6,118,389 A | * | 9/2000 | Kamada et al. ........ 340/995.21 |

* cited by examiner

*Primary Examiner*—Yonel Beaulieu
(74) *Attorney, Agent, or Firm*—Brinks Hofer Gilson & Lione

(57) ABSTRACT

In a navigation apparatus, when a first detour route for detouring around part of an initial route is present and the calculation of a second detour route is instructed, a route search processing unit determines whether the ratio of the distance of the first detour route to the total distance to be traveled when a vehicle returns to the initial route from the current position thereof via the first detour route and travels to a destination exceeds a preset value. If the ratio does not exceed the preset value, the route search processing unit increases cost of at least a link associated with the first detour route, and searches for the second detour route. If the ratio exceeds the preset value, the route search processing unit searches for a new route that links the current position of the vehicle and the destination.

24 Claims, 10 Drawing Sheets

NAVIGATION APPARATUS

BACKGROUND OF THE INVENTION

1. Field of the Invention

The present invention relates to navigation apparatuses. More specifically, the present invention relates to a navigation apparatus that has a route searching function for searching for a route to a destination, a detour route searching function for searching for a detour route for detouring around a partial segment of a route found by the route searching function, and a return route searching function for searching for a return route for returning to an original route when a vehicle turns off the route.

2. Description of the Related Art

On-vehicle navigation apparatuses generally have various functions including a map displaying function for displaying a map of the vicinity of the position of the vehicle on a screen, a route searching function for searching for a route to a destination or a point on route specified by a user, and a route guidance function for guiding the vehicle to travel along a route found by a route search.

Furthermore, many navigation apparatuses have a detour route searching function for searching for a detour route for detouring around a segment of a current route, for example, when the traffic is heavy on the current route, and a return route searching function for searching for a return route for returning to an original route when the vehicle turns off the route.

For the detour route searching function, a distance to be detoured (e.g., two kilometers) is specified and a high cost is set for a road in the segment to be detoured, so that a detour route for returning to an initial route is searched for while avoiding the segment.

For the return route searching function, when the vehicle turns off the route, a route for returning to a point on an initial route (e.g., an intersection that has not been passed and that is nearest to the position of the vehicle) at an optimal cost is searched for as a return route.

In a conventional navigation apparatus, it sometimes occurs that an inappropriate detour route is set when a search for a detour route is repeated in a relatively short period.

FIGS. 10A to 10C are diagrams showing an example where an inappropriate detour route is set in a conventional navigation apparatus. A case where a route r1 to a destination d is set and an instruction for calculation of a detour route is issued three times repeatedly, as shown in FIG. 10A, will be considered. Since it is unlikely that a user changes the detour distance each time the calculation instruction is issued, it is assumed that the detour distance is fixed at a preset value (e.g., two kilometers).

In this case, when a first instruction for calculation of a detour route is issued, a detour route r2 for returning to the initial route r1 from the current position g of the vehicle while detouring a segment p1 corresponding to the detour distance is searched for, as shown in FIG. 10A. Then, when a second instruction for calculation of a detour route is issued, a new return route r3 for returning to the previous detour route r2 from the current position g of the vehicle while detouring a segment p2 corresponding to the detour distance is searched for, as shown in FIG. 10B. Then, when a third instruction for calculation of a detour route is issued, a new return route r4 for returning to the previous detour route r3 from the current position g of the vehicle while detouring a segment p3 corresponding to the detour distance is searched for, as shown in FIG. 10C.

When a search for a detour route is repeated in a relatively short period as described above, in order to return to the original route r1, the vehicle first returns to the detour route r3 via the detour route r4, then returns to the detour route r2 via the detour route r3, and finally returns to the original route r1 via the detour route r2, as shown in FIG. 10C. Thus, more than a necessary number of right turns and left turns are made to return to the original route r1; that is, a detour route with many deviations overall is set. Such a return route incurs an increased travel distance and time, which is inappropriate in consideration of the original intent to find a detour route for detouring part of the original route r1 in order to avoid an increase in travel time due to heavy traffic, etc. That is, the conventional navigation apparatus suffers from a problem that an inappropriate route is set when a search for a detour route is repeated several times.

Furthermore, when a search for a detour route has been repeated several times, in some cases more reasonable route guidance can be achieved by newly searching at that time for a route directly going to the destination than by returning to the original route. However, the conventional navigation apparatus does not execute such a process, and it simply searches for a detour route for returning to the original route irrespective of the current position of the vehicle, the distance to the destination, the distance of the detour route, etc.

A similar problem may also arise in searching for a return route when the vehicle has turned off a guided route. For example, when the vehicle has turned off an original route, a return route for returning to the original route is searched for, and if the vehicle further turns off the return route repeatedly, in some cases more reasonable route guidance can be achieved by newly searching at that time for a route directly going to the destination than by searching for a new return route for returning to the previous return route (or to the original route) each time. Even in such cases, the conventional navigation apparatus does not execute such a process, and it sometimes sets a lengthy, inappropriate return route irrespective of the current position of the vehicle, the distance to the destination, the distance of the detour route, etc., similar to the case of the detour route described above.

SUMMARY OF THE INVENTION

The present invention has been made in view of the above problems, and it is an object of the present invention to provide a navigation apparatus in which the selection of an inappropriate route is prevented when a detour route or return route is calculated.

To this end, the present invention, in one aspect thereof, provides a navigation apparatus including a destination setting device for setting a destination; a route searching device for searching for an initial route to the destination set by the destination setting device, under a given condition; a detour calculation instruction device for instructing the calculation of a detour route; and a detour route searching device for searching for a detour route for returning to the initial route, wherein when an instruction for first calculation of a detour route is issued by the detour calculation instruction device with a detour distance specified, the detour route searching device searches for a detour route while increasing the cost of a link corresponding to the detour distance specified by the detour calculation instruction device, whereas when an instruction for a second or subsequent calculation of a detour route is issued, the detour route searching device searches for a detour route while increasing the cost of each link corresponding to a detour route that has been found according to a previous instruction for the calculation of a detour route.

When a second or subsequent calculation of a detour route is instructed, the cost of a link corresponding to the entire previous detour route is increased before searching for a new detour route for returning to the initial route, so that the selection of a lengthy, inappropriate detour route is prevented even if the search for a detour route is executed a plurality of times.

Preferably, the navigation apparatus further includes a route researching device for searching again for a route to the destination set by the destination setting device when an instruction for a second or subsequent calculation of a detour route is issued and if a ratio of a distance of a detour route found by the detour route searching device exceeds a preset value. If the ratio of a detour route exceeds the preset value, that is, if the detour route is too long, a route from the current position of the vehicle to the destination is searched for again instead of searching for a detour route for returning to the initial route, so that an appropriate route with a short traveling distance, traveling time, etc. is found.

Preferably, the navigation apparatus further includes an instruction screen display device for displaying an instruction screen, the instruction screen including a first area for selecting one of a plurality of candidates of detour distance and for instructing the calculation of a detour route, and a second area for instructing the calculation of a detour route without specifying a detour distance, wherein, when the second area included in the instruction screen is specified by the detour calculation instruction device, the detour route searching device searches for a detour route assuming that a second or subsequent calculation of a detour route has been instructed. Since the first area for showing a plurality of candidates of detour distance and for selecting one therefrom is provided, ease of operation in specifying a detour distance is improved. Furthermore, since the second area for instructing the calculation of a detour route without specifying a detour distance is provided, the operation for instructing a second or subsequent search for a detour route is facilitated.

Preferably, the instruction screen display device prohibits the selection of a candidate of detour distance, included in the first area, that has already been selected in a state where an instruction for a second or subsequent calculation of a detour route is allowed. Because the same detour distance is prohibited from being selected more than once, the selection of a lengthy detour route resulting from repeating the same detour distance a plurality of times is prevented.

Preferably, the navigation apparatus further includes a vehicle position detecting device for detecting a current position of a vehicle, wherein, when a second or subsequent calculation of a detour route is instructed, the detour route searching device sequentially tracks each detour route that has been found according to a previous instruction for calculation of a detour route from the current position of the vehicle to the initial route before executing a search for a detour route according to the instruction for a second or subsequent calculation of a detour route, and increases the cost of each link that constitutes each detour route that has been tracked. Accordingly, a new detour route is found while avoiding as much as possible a detour route that has previously been found.

Preferably, the detour route searching device increases the cost of each link by multiplying the original cost thereof by a multiplier value, the multiplier value increasing in order of a detour route including the link being a minor street, a main road, and a highway. Accordingly, minor streets, main roads, and highways are selected in that order of priority when searching for a detour route, so that an efficient detour route is calculated.

Preferably, the ratio is the ratio of a distance of a previous detour route found by a previous search for a detour route by the detour route searching device to a total distance to be traveled when the vehicle returns to the initial route via the previous detour route and travels to the destination. Accordingly, it is determined what percentage of the entire route to be traveled when the vehicle returns to the initial route via the detour route and travels to the destination is represented by the detour route, so that whether the detour route too long can be accurately evaluated.

Alternatively, the ratio may be a ratio of the distance of a previous detour route to a total distance to be traveled when the vehicle travels from the current position to the destination along the initial route. Accordingly, it is determined what percentage of the total distance to be traveled when the vehicle travels from the current position to the destination via the initial route is represented by the detour route, so that whether the detour route too long can be accurately evaluated.

Yet alternatively, the ratio may be a ratio of the distance of a previous detour route to a straight line distance from the current position of the vehicle to the destination. By calculating the ratio as such, whether the detour route is too long can be approximately evaluated. This method in particular is advantageous because the calculation is simple and processing is simplified.

Preferably, the ratio is set to be 25%. Most users will feel that detour routes with a distance ratio exceeding approximately 1/4 to be too long. Accordingly, evaluation will be in accordance with the user's taste by using the ratio of 25% as a criterion.

The navigation apparatus may further include a ratio setting device for arbitrarily setting the ratio within a predetermined range. Accordingly, for example, when an individual user feels that a default value of the ratio is inappropriate, the user is allowed to change the value of the ratio as desired.

The present invention, in another aspect thereof, provides a navigation apparatus including a vehicle position detecting device for detecting the current position of a vehicle; a destination setting device for setting a destination; a route searching device for searching for an initial route to the destination set by the destination setting device, under a given condition; a recalculation instruction device for determining whether the current position of the vehicle detected by the vehicle position detecting device is off the initial route found by the route searching device, and for instructing the recalculation of a route if the current position of the vehicle is determined to be off the initial route; and a return route searching device for searching for a return route; wherein, when a first recalculation is instructed by the recalculation instruction device, the return route searching device searches for a return route for returning to the initial route found by the route searching device, whereas when a second or subsequent recalculation is instructed, the return route searching device searches again for a route to the destination if the ratio of a return route that has previously been found exceeds a preset value while searching for a different return route for returning to the initial route if the ratio does not exceed the preset value.

When a second or subsequent recalculation is instructed and if the ratio of a previous route that has previously been found exceeds the preset value, that is, if the return route is too long, an appropriate route with a shorter travel distance and time is often found by searching again for a route from the current position of the vehicle to the destination instead of searching for a return route for returning to the initial route. Accordingly, if the ratio of the previously found return route exceeds the preset value, a route to the destination is searched for again, so that the selection of a lengthy, inappropriate return route is prevented.

Preferably, the return route searching device searches for a different return route for returning to the initial route until a recalculation is instructed more than a predetermined number of times by the recalculation instruction device. Until a recalculation is instructed more than the predetermined number of times, it can be assumed that the current position of the vehicle is not so far off the initial route and that a return route not so lengthy will usually be found. Accordingly, in such a case, a different return route is searched for, so that processing load is reduced and route guidance is resumed more quickly compared with a case where an entire route to the destination is searched for again.

Preferably, the ratio is a ratio of the distance of a previous return route found by a previous search for a return route by the return route searching device to a total distance to be traveled when the vehicle returns to the initial route via the previous return route and travels to the destination. Accordingly, it is determined what percentage of the entire route to be traveled when the vehicle returns to the initial route via the return route and travels to the destination is represented by the return route, so that whether the return route is lengthy can be accurately evaluated.

Alternatively, the ratio may be a ratio of the distance of a previous return route to a total distance to be traveled when the vehicle travels from a current position to the destination along the initial route. Accordingly, it is determined what percentage of the total distance to be traveled when the vehicle travels from the current position to the destination via the initial route is represented by the return route, so that whether the return route is lengthy can be accurately evaluated.

Yet alternatively, the ratio may be the ratio of the distance of a previous return route to a straight line distance from a current position of the vehicle to the destination. By calculating the ratio as such, whether the return route is too long can be approximately evaluated. This method in particular is advantageous because the calculation is simple and processing is simplified.

Preferably, the navigation apparatus further includes a ratio setting device for arbitrarily setting the ratio within a predetermined range. Accordingly, for example, when an individual user feels that a default value of the ratio is inappropriate, the user is allowed to change the value of the ratio as desired.

DESCRIPTION OF THE PREFERRED EMBODIMENTS

A navigation apparatus according to an embodiment of the present invention will now be described with reference to the accompanying drawings.

Figure 1:
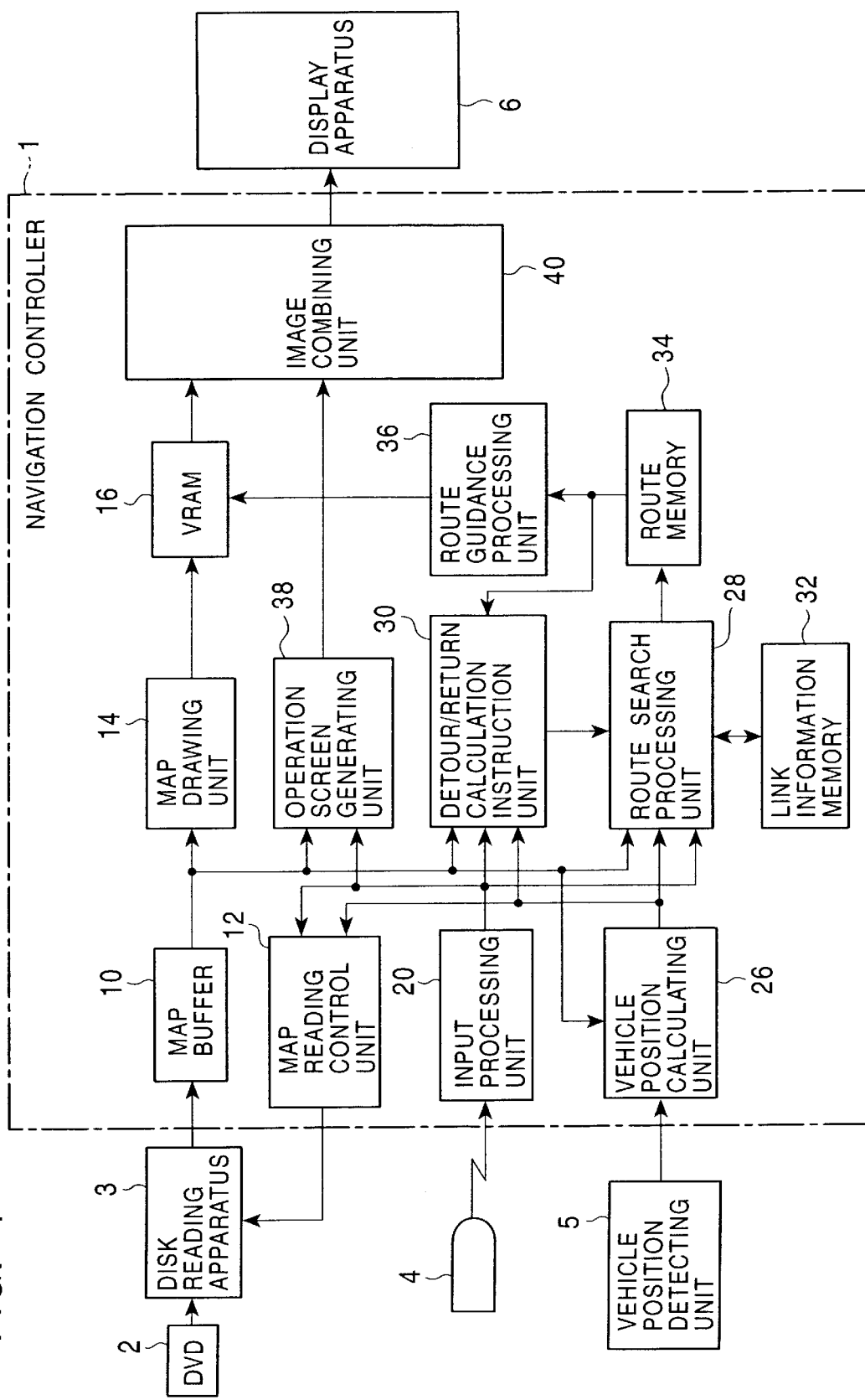
FIG. 1 is a diagram showing the general construction of a navigation apparatus according to an embodiment of the present invention.

FIG. 1 is a diagram showing the general construction of the navigation apparatus according to the embodiment. The navigation apparatus shown in FIG. 1 includes a navigation controller 1, a DVD 2, a disk reading apparatus 3, a remote control unit 4, a vehicle position detecting unit 5, and a display apparatus 6.

The navigation controller 1 controls the overall operation of the navigation apparatus. The navigation controller 1 implements its functionality by executing predetermined operation programs using a CPU, a ROM, a RAM, etc. The construction of the navigation controller 1 will be described later in detail.

The DVD 2 is an information storage medium storing map data needed for displaying a map, searching for a route, etc. More specifically, the map data stored in the DVD 2 includes (1) a "drawing unit" including various data needed for displaying a map image; (2) a "road unit" including various data needed for processes such as map matching, route searching, and route guidance; (3) an "intersection unit" including various data representing detailed information regarding intersections; etc. Furthermore, the map data represents road data using nodes associated with intersections, etc. and links between the nodes. That is, various properties of roads, intersections, etc. are recorded in association with the nodes and links.

The disk reading apparatus 3 allows mounting of one or more DVDs 2, and it reads map data from one of the DVDs 2 under the control of the navigation controller 1. Disks to be mounted need not be DVDs, and may be, for example, CDs. Also, the arrangement may be such that DVDs and CDs can be selectively mounted.

The remote control unit 4 includes a joystick for specifying up-down and right-left directions, a numeric keypad, and various operation keys including an "OK" key for selecting various settings, etc., and it outputs signals in accordance with various operations to the navigation controller 1.

The vehicle position detecting unit 5 includes, for example, a GPS receiver, a direction sensor, a distance sensor, etc., and it detects, at a predetermined timing, a position (longitude and latitude) of a vehicle on which the navigation apparatus is mounted, providing a result of the detection.

The display apparatus 6 displays various images such as a map image of the vicinity of the vehicle position based on drawing data provided from the navigation controller 1.

Next, the construction of the navigation controller 1 will be described in detail. The navigation controller 1 shown in FIG. 1 includes a map buffer 10, a map reading control unit 12, a map drawing unit 14, a VRAM 16, an input processing unit 20, a vehicle position calculating unit 26, a route search processing unit 28, a detour/return calculation instruction unit 30, a link information memory 32, a route memory 34, a route guidance processing unit 36, an operation screen generating unit 38, and an image combining unit 40.

The map buffer 10 temporarily stores map data read from the DVD 2 by the disk reading apparatus 3.

The map reading control unit 12 outputs a request for reading map data of a predetermined range to the disk reading apparatus 3 based on the current position of the vehicle calculated by the vehicle position calculating unit 26, a request from the input processing unit 20, etc.

The map drawing unit 14 generates map data for displaying a map image based on the map data stored in the map buffer 10.

The VRAM 16 temporarily stores map drawing data provided from the map drawing unit 14.

The input processing unit 20 provides instructions for executing operations corresponding to various operation instructions, issued via the remote control unit 4, to relevant parts of the navigation controller 1.

The vehicle position calculating unit 26 calculates the current position and direction of the vehicle based on detection data provided from the vehicle position detecting unit 5, and it executes a map matching process for correcting the calculated current position of the vehicle if the position is not on a road in the map data.

The route search processing unit 28 searches for a route that links a given departure point and a destination under a given condition. Also, when a detour calculation instruction is issued from the detour/return calculation instruction unit 30 while route guidance along a route found in advance is under way, the route search processing unit 28 searches for a detour route for detouring around a specific segment of an original route (hereinafter referred to as an "initial route") or searches again for a route that links the current position of the vehicle and the destination.

Also, when the vehicle turns off the initial route found in advance, while route guidance along the initial route is under way, and if a return calculation instruction is issued from the detour/return calculation instruction unit 30, the route search processing unit 28 searches for a return route for the vehicle to return to the initial route, or searches again for a route that links the current position of the vehicle and the destination.

The detour/return calculation instruction unit 30 specifies the distance of a segment to be detoured based on an operation instruction by a user, and instructs the route search processing unit 28 to calculate a detour route. Furthermore, the detour/return calculation instruction unit 30 determines whether the vehicle has turned off the route, and instructs the route search processing unit 28 to calculate a return route for returning to the original route if the current position of the vehicle is determined as being off route.

The link information memory 32 stores information regarding links (described later in detail) constituting an initial route, a detour route, etc. based on an instruction from the route search processing unit 28.

The route memory 34 stores a route extracted by the route search processing unit 28. The route guidance processing unit 36 executes a route guidance process including generation of drawing data for displaying a route (guidance route) stored in the route memory 34 as superimposed on a map.

The operation screen generating unit 38 generates drawing data for displaying an operation screen (instruction screen) needed for the user to issue various operation instructions, for example, an operation screen for setting a detour distance when searching for a detour route as described earlier.

The image combining unit 40 combines drawing data read from the VRAM 16 and drawing data output from the operation screen generating unit 38, providing the combined drawing data to the display apparatus 6.

The remote control unit 4 and the input processing unit 20 correspond to a destination setting means and a ratio setting means; the route search processing unit 28 corresponds to a route searching means, a detour route searching means, a route re-searching means, and a return route searching means; the detour/return calculation instruction unit 30 corresponds to a detour calculation instruction means and a recalculation instruction means; the display apparatus 6, the operation screen generating unit 38, and the image combining unit 40 correspond to an instruction screen display means; and the a vehicle position detecting unit 5 corresponds to vehicle position detecting means.

The navigation apparatus according to this embodiment is constructed as described above. Now, the operation of the navigation apparatus will be described in relation to a case where a detour route or a return route is searched for while route guidance along a preset initial route is under way.

(a) Operation in Searching for a Detour Route

Figure 2:
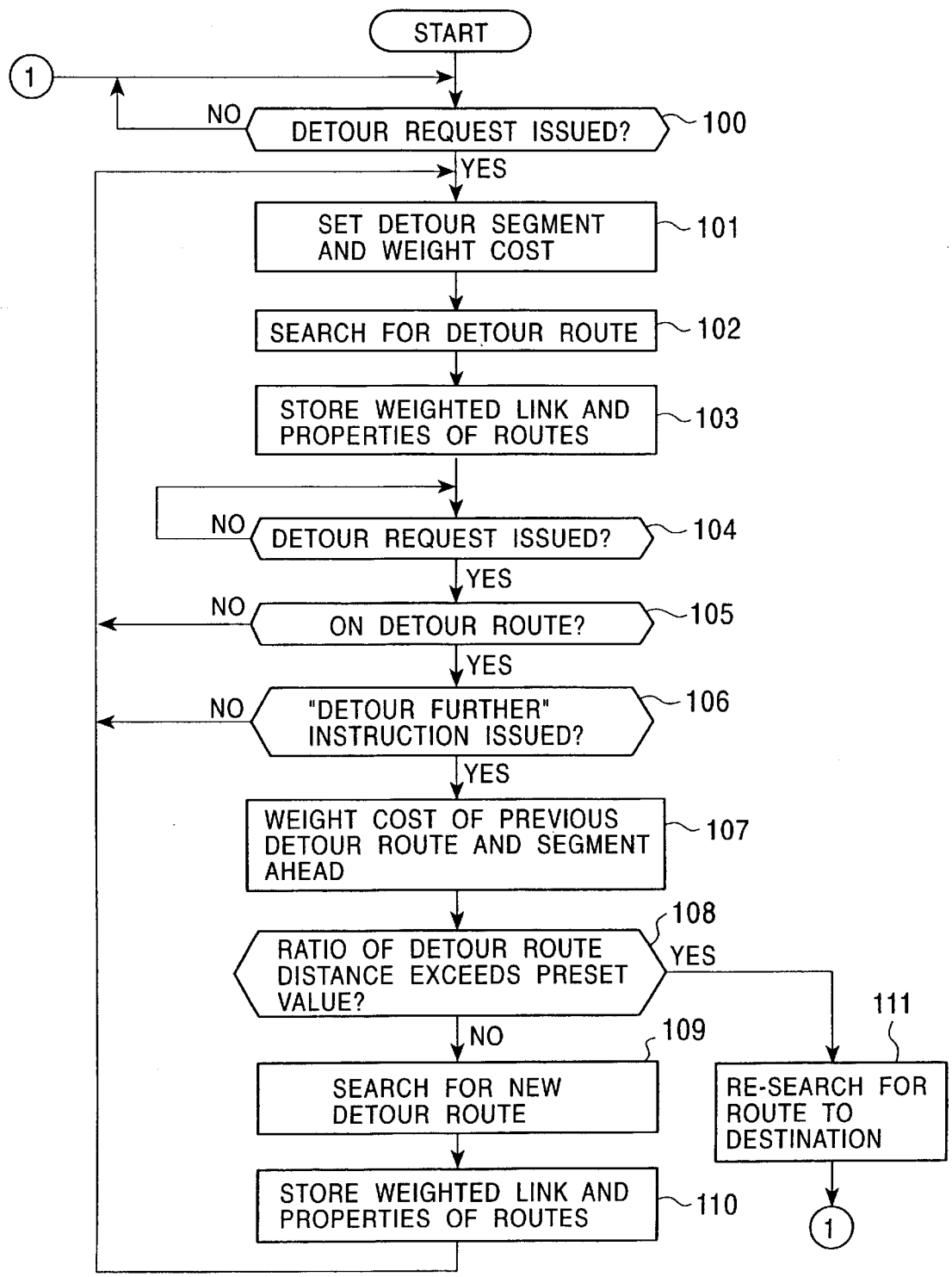
FIG. 2 is a flow diagram showing a procedure of operation of the navigation apparatus in searching for a detour route.

FIG. 2 is a flow diagram showing a procedure of operation of the navigation apparatus in searching for a detour route.

The detour/return calculation instruction unit 30 determines whether a user has issued a detour request for detouring around a partial segment of an initial route (step 100). If it is determined in step 100 that a detour request has not been issued, the test in step 100 is repeated.

When it is determined in step 100 that a detour request has been issued, the operation screen generating unit 38 generates a predetermined operation screen, which is displayed on the display apparatus 6. Based on an operation instruction issued by the user via the operation screen, the detour/return calculation instruction unit 30 specifies a distance to be detoured (detour distance), and instructs a first detour route calculation to the route search processing unit 28. Upon receiving the instruction, the route search processing unit 28 assigns a predetermined weight on the cost of a link corresponding to a detour segment (described later in detail) (step 101).

Figure 3:
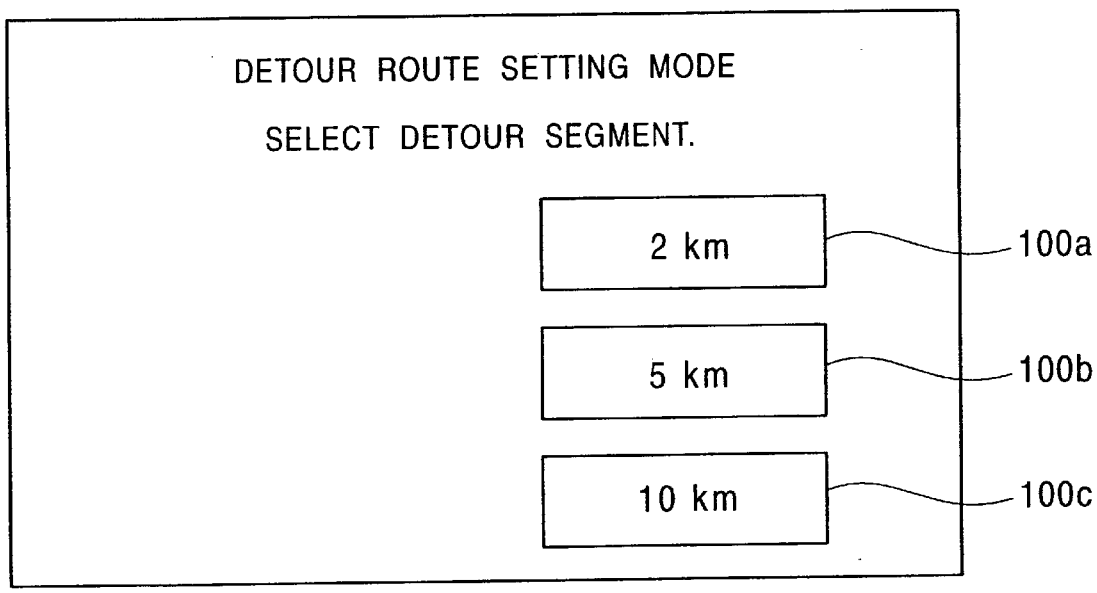
FIG. 3 is an illustration of an example display of an operation screen for setting a detour segment.

FIG. 3 is an illustration of an example display of an operation screen for setting a detour segment. When a detour request is issued, the operation screen generating unit 38 generates an operation screen including operation buttons 100a through 100c for specifying a detour distance, as shown in FIG. 3, which is displayed on a screen of the display apparatus 6. An area where the operation buttons 100a through 100c are displayed corresponds to a "first area."

A detour distance can be specified by pressing one of the operation buttons 100a through 100c. For example, if the operation button 100a is pressed, a detour distance of 2 km is set. In that case, the route search processing unit 28 sets a segment extending 2 km ahead from the current position of the vehicle along the initial route as a detour segment, and assigns the predetermined weight on the cost of a link corresponding to the detour segment, i.e., increases the cost of the link.

More specifically, the cost of a link corresponding to a detour segment is weighted by multiplying an inherent cost preset for the specific link by a predetermined detour cost coefficient associated with a corresponding type of road. The value of the detour cost coefficient is, for example, 1.5 for a minor street, 2 for a main road (such as a national road), and 3 for a highway. By setting the detour cost coefficients as such, minor streets, main roads, and highways are selected in that order of priority when searching for a detour route, so that an efficient detour route is more likely to be found.

When the cost of the link corresponding to the detour segment has been weighted, the route search processing unit 28 searches for a detour route for detouring around the detour segment and returning to the initial route at a point ahead (step 102).

Then, the route search processing unit 28 stores the link having been weighted in step 101 in the link information memory 32, and also stores property information indicating whether each route is an "initial route" or a "detour route" in the link information memory 32 (step 103).

Figure 4:
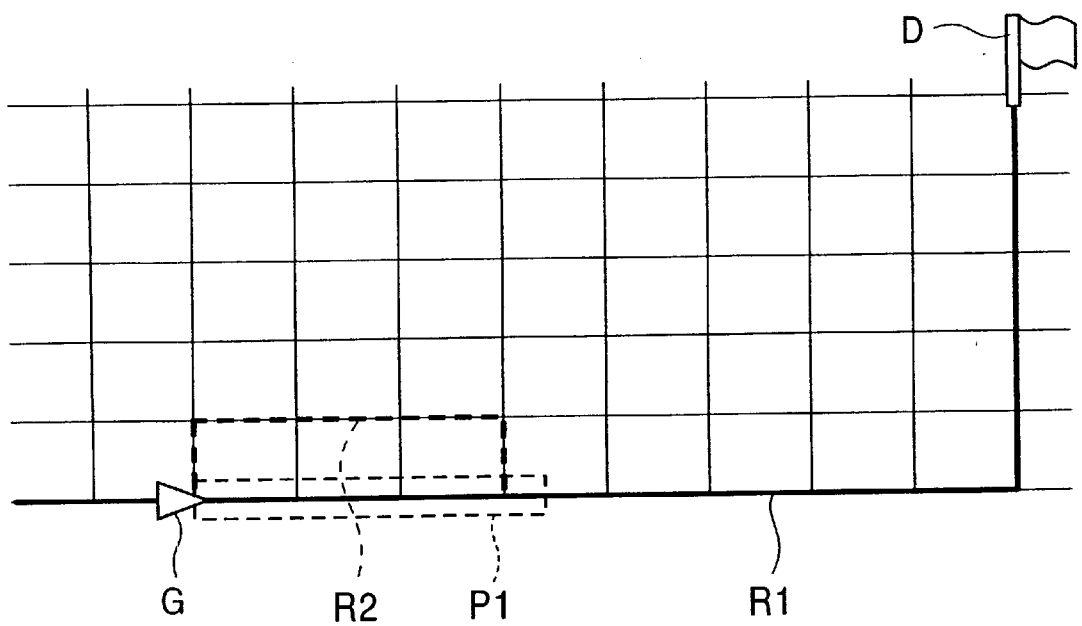
FIG. 4 is a diagram illustrating the processes in steps 102 and 103.

FIG. 4 is an illustration showing the processes in steps 102 and 103 described above. A vehicle on which the navigation apparatus is mounted is traveling along an initial route R1 to a preset destination D, and a segment ahead of a current position G of the vehicle along the initial route R1 is set as a detour segment P1. The cost of a link included in the detour segment P1 is weighted and then a detour route is searched for, and as a result, a detour route R2 for detouring around the detour segment P1 is newly set.

In this case, property information indicating that a link constituting the initial route R1 is an "initial route" and that a link constituting the detour route R2 is a "detour route" is stored in the link information memory 32. With regard to the link included in the detour segment P1, information indicating that the cost thereof has been weighted and the weighted cost are stored.

Then, the detour/return calculation instruction unit 30 determines whether the user has issued a detour request for detouring around part of the current route (step 104). If it is determined in step 104 that a detour request has not been issued, the test in step 104 is repeated.

If it is determined in step 104 that a detour request has been issued, the detour/return calculation instruction unit 30 determines whether the vehicle is traveling on a detour route (step 105). If it is determined in step 105 that the vehicle is not traveling on a detour route, that is, if it is determined that the vehicle has already traveled through the detour route and is currently traveling on the initial route, the procedure returns to step 101, and the subsequent processes are repeated.

When it is determined in step 105 that the vehicle is traveling on a detour route, the operation screen generating unit 38 generates an operation screen for setting a new detour segment, which is displayed on the screen of the display apparatus 6.

Figure 5:
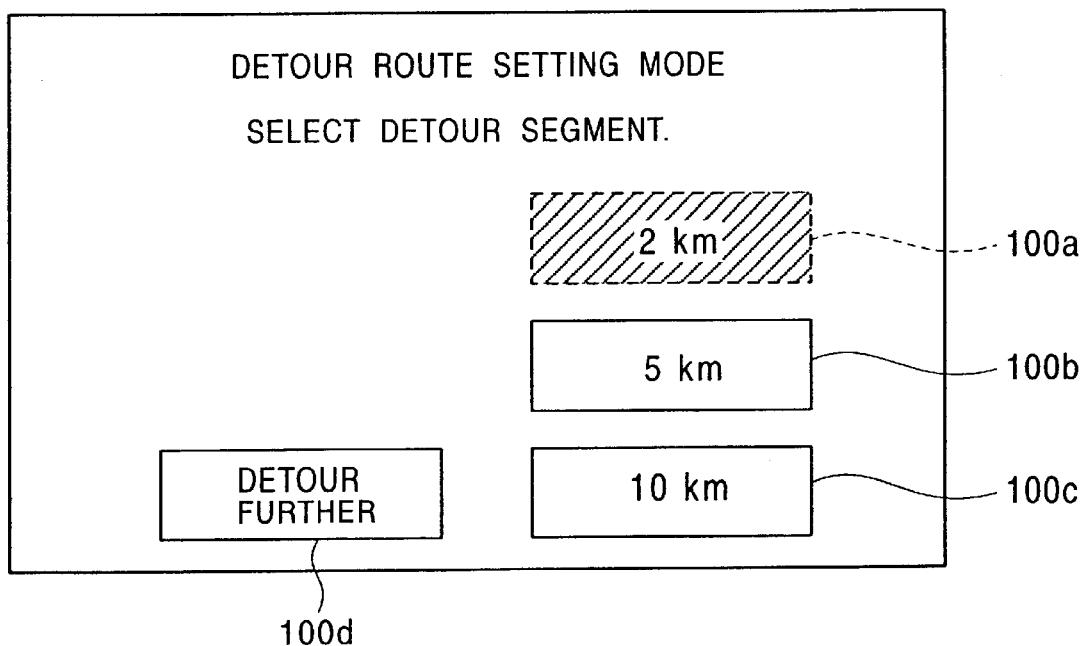
FIG. 5 is an illustration of an example display of an operation screen for setting a new detour segment.

FIG. 5 is a diagram of an example display of an operation screen for setting a new detour segment. As shown in FIG. 5, the operation buttons 100*a* through 100*c* for specifying a distance of the detour segment are displayed, and as opposed to the operation screen described earlier and shown in FIG. 3, an operation button 100*d* labeled as "detour further" is additionally displayed. The operation button 100*d* labeled as "detour further" is used to instruct the calculation of a detour route without specifying a detour distance, and a process that is executed when the operation button 100*d* is pressed will be described later in detail. An area where the operation button 100*d* is displayed corresponds to a "second area."

Furthermore, in this embodiment, a distance that has been specified before is prohibited from being specified again, and an operation button associated therewith (the operation button 100*a* in FIG. 5) is displayed to be darker or semi-transparent. This prohibits the same detour distance to be selected more than once, and accordingly, the selection of a lengthy detour route resulting from the repeated selection of the same detour distance is prevented.

When the operation screen described above is displayed, the detour/return calculation instruction unit 30 determines whether the operation button 100*d* has been pressed to instruct "detour further" (step 106). If it is determined in step 106 that an operation button other than "detour further" (e.g., the operation button 100*b*) has been pressed, the procedure returns to step 101, and a new detour segment in accordance with a specified distance is set for the current detour route, and then a new detour route is searched for.

If it is determined in step 106 that "detour further" has been instructed, the detour/return calculation instruction unit 30 instructs the route search processing unit 28 to calculate a detour route with a segment including the current detour route and a specific segment ahead thereof (described later in detail) as a new detour segment. The instruction corresponds to an "instruction for a second or subsequent calculation of a detour route." Upon receiving the instruction, the route search processing unit 28 assigns a predetermined weight on the cost of a link corresponding to the new detour segment (step 107). As described above, in this embodiment, the operation button 100*d* for instructing the calculation of a detour route without specifying a detour distance is provided, facilitating the operation for instructing a second or subsequent search for a detour route. The details of the weighting of the link in step 107 are the same as those in step 101 described earlier.

Then, the route search processing unit 28 determines whether the ratio of the distance of the previous detour route exceeds a preset value (step 108). More specifically, in this embodiment, the preset value is 25% by default, and it is determined whether the ratio of the distance of the previous detour route to the total distance to be traveled when the vehicle returns to the initial route via the detour route and travels to the destination exceeds 25%.

In this embodiment, the user is allowed to arbitrarily change the preset value within a predetermined range (e.g., from 0% to 100%) using the remote control unit 4. Thus, for example, when the user personally feels that the default value of 25% is inappropriate, the user is allowed to change the value of the ratio as desired.

If it is determined in step 108 that the ratio of the previous detour route does not exceed the preset value, the route search processing unit 28 searches for a new detour route that is different from the current detour route (step 109).

Figure 6:
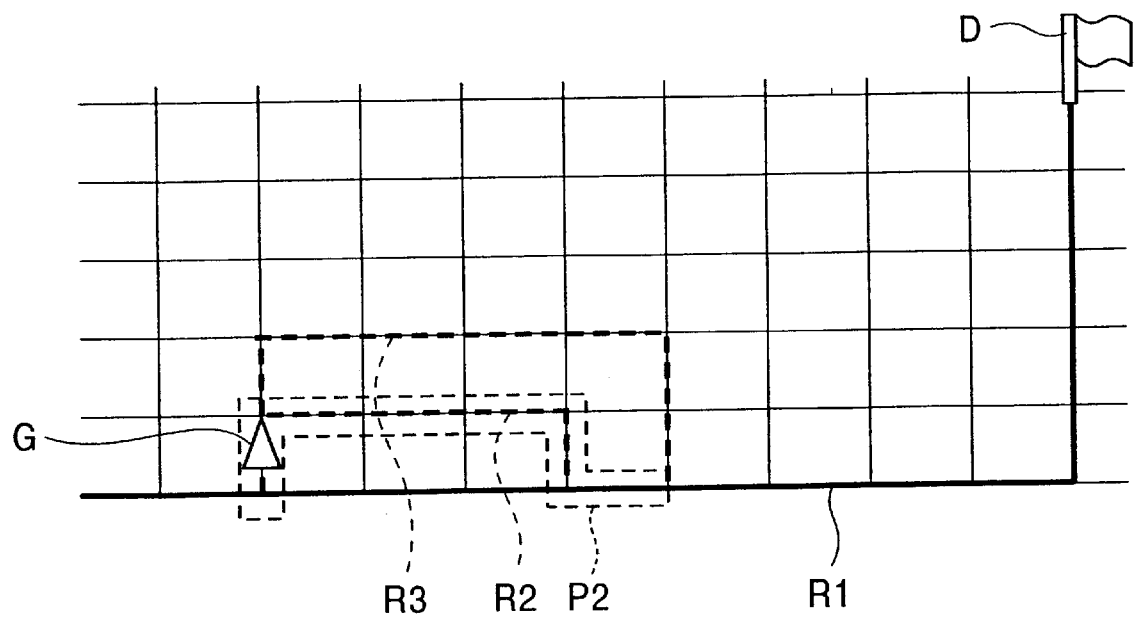
FIG. 6 is an illustration of the a process in step 109.

FIG. 6 is an illustration of the process in step 109. In step 107 described earlier, the detour route R2 is identified based on the content of data stored in the link information memory 32, a detour segment P2 including the detour route R2 and a specific segment ahead thereof. More specifically, a segment corresponding to at least one link included in the initial route R1 is set, links corresponding to the detour segment P2 are sequentially tracked from the current position of the vehicle, and weights are assigned to the costs of the links constituting the detour segment P2.

Also, with regard to the link included in the detour segment P1 described earlier and shown in FIG. 4, information that it is an initial route and that the cost thereof has been weighted is stored in the link information memory 32. Thus, in step 109, a detour route is searched for with the weighted costs of these links taken into consideration. Accordingly, a new detour route R3 is found, avoiding links with high costs as much as possible.

Then, similar to step 103 described earlier, the route search processing unit 28 stores the links with weighted costs in the link information memory 32, and also stores property information as to whether each route is an "initial route" or a "detour route" in the link information memory 32 (step 110). The procedure then returns to step 101, and the subsequent processes are repeated.

When it is determined in step 108 that the ratio of the distance of the current detour route exceeds the preset value, the route search processing unit 28 searches again for a route that links the current position of the vehicle and the destination at an optimal cost (step 111). The procedure then returns to step 100, and the subsequent processes are repeated.

Figure 7:
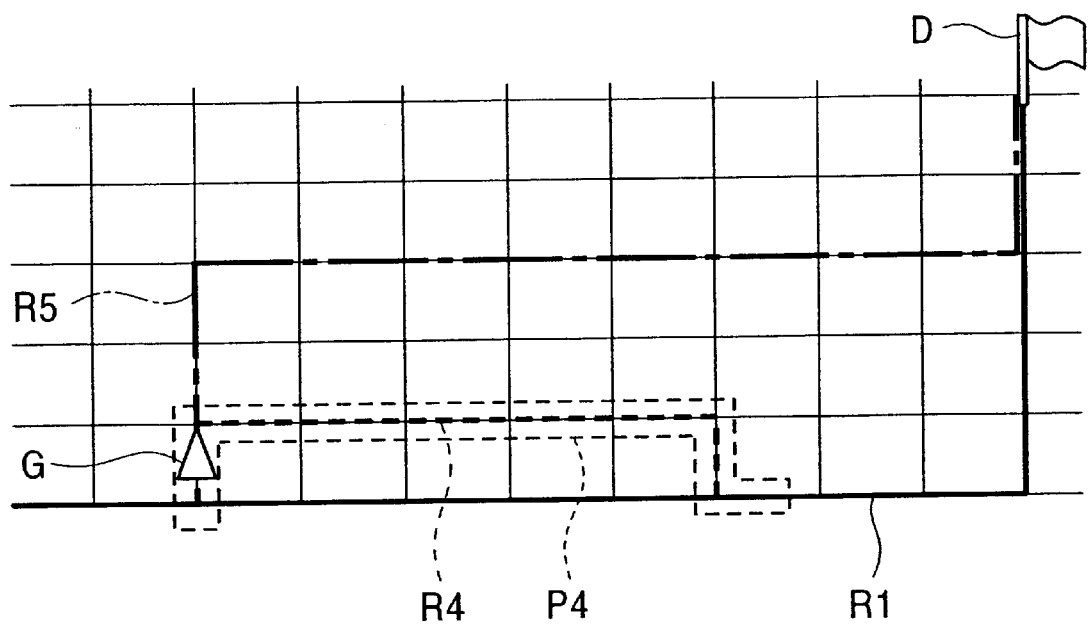
FIG. 7 is an illustration of the process in step 111.

FIG. 7 is an illustration of the process in step 111. Similar to the case of FIG. 6 described earlier, a detour segment P4 is set in association with a previous detour route R4, and a weight is assigned to a link corresponding to the detour segment P4. Also, with regard to the link included in the initial route R1, information that it is an initial route and that the cost thereof has been weighted is stored in the link information memory 32 (step 103). Thus, in step 111, a route that links the current position G of the vehicle and the destination D at an optimal cost is searched for again with the weighted costs of these links taken into consideration. Accordingly, as shown in FIG. 7, a new route R5 is found, avoiding links with high costs as much as possible.

(b) Operation in Searching for a Return Route

The operation of the navigation apparatus in searching for a return route for returning to an original route when the vehicle has turned off the original route will be described.

Figure 8:
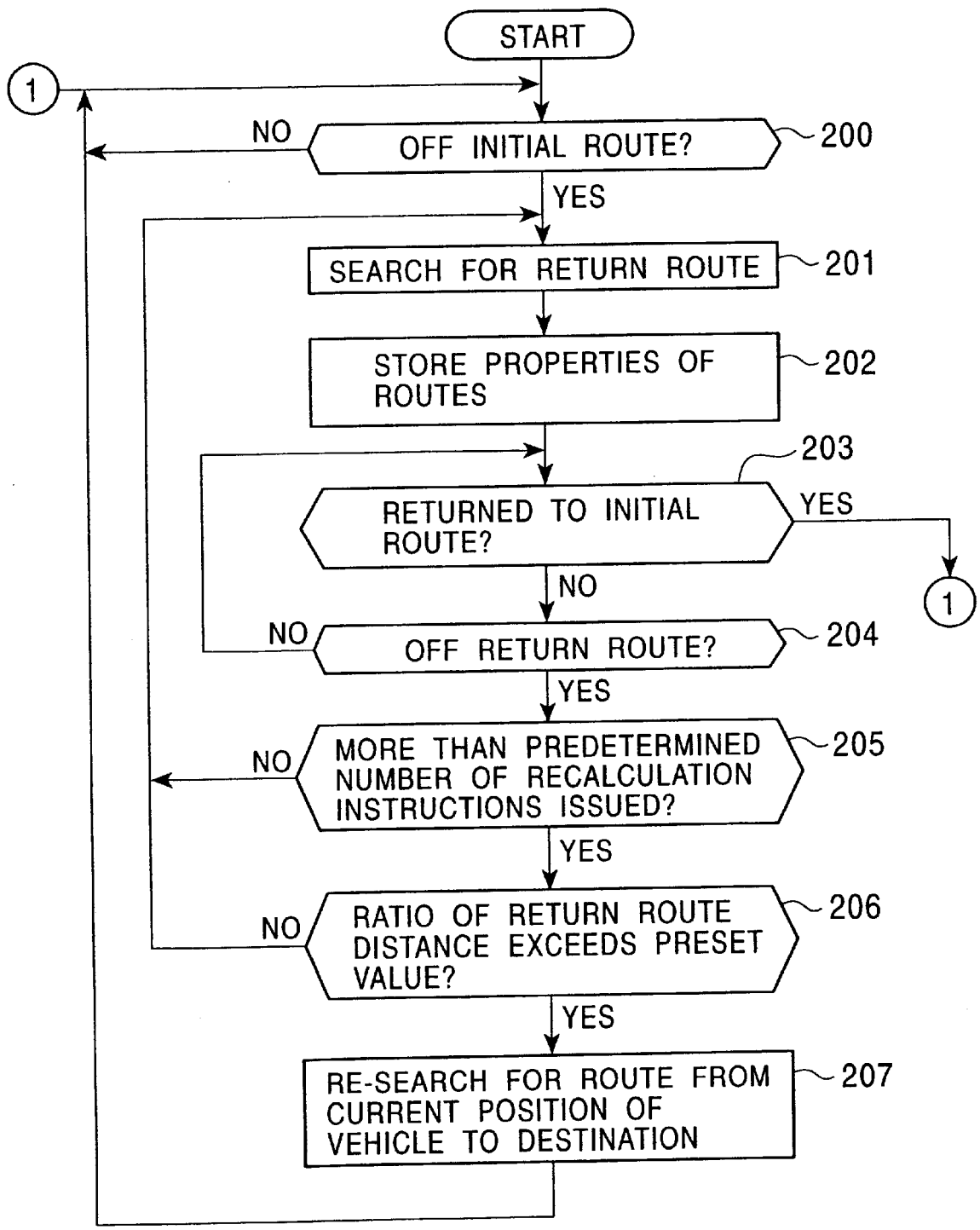
FIG. 8 is a flow diagram showing a procedure of operation of the navigation apparatus in searching for a return route.

FIG. 8 is a flow diagram showing a procedure of operation of the navigation apparatus in searching for a return route.

The detour/return calculation instruction unit 30 determines whether the vehicle has turned off an initial route (step 200). If it is determined in step 200 that the vehicle has not turned off the initial route, the test in step 200 is repeated.

If it is determined in step 200 that the vehicle has turned off the initial route, the detour/return calculation instruction unit 30 instructs the route search processing unit 28 to search for a return route.

Upon receiving the instruction, the route search processing unit 28 searches for a return route that links the current position of the vehicle and a specific point on the initial route (step 201). For example, the route search processing unit 28 sequentially selects several intersections nearest to the position of the vehicle, included in the initial route, and searches for routes to the intersections, determining a route with the lowest cost as a return route.

Next, the route search processing unit 28 stores the property of each route, i.e., whether it is an "initial route" or a "return route," in the link information memory 32 (step 202).

Then, the detour/return calculation instruction unit 30 determines whether the vehicle has returned to the initial route (step 203). If it is determined in step 203 that the vehicle has returned to the initial route, the procedure returns to step 200, and the subsequent processes are executed.

If it is determined in step 203 that the vehicle has not returned to the initial route, the detour/return calculation instruction unit 30 determines whether the vehicle has turned off the return route (step 204). If it is determined in step 204 that the vehicle has not turned off the return route, the procedure returns to step 203, in which the test as to whether the vehicle has returned to the initial route is repeated.

If it is determined in step 204 that the vehicle has turned off the return route, the detour/return calculation instruction unit 30 instructs the route search processing unit 28 to search for a return route.

Upon receiving the instruction, the route search processing unit 28 determines whether the detour/return calculation instruction unit 30 has issued an instruction for calculating a detour route (recalculation instruction) more than a predetermined number of times (e.g., twice) (step 205). If it is determined in step 205 that the recalculation instruction has not been issued more than the predetermined number of times, the route search processing unit 28 returns to step 201, searching for a new return route that is different from the current return route.

If the recalculation instruction has not been issued more than the predetermined number of times, it is assumed that the vehicle has not turned far off the initial route and that a return route that is not too lengthy will usually be obtained. Accordingly, in that case, a new return route is searched for, so that the processing load is less and route guidance is resumed more quickly compared with a case where an entire route to the destination is searched for again.

If it is determined in step 205 that the recalculation instruction has been issued more than the predetermined number of times, the route search processing unit 28 determines whether a ratio of the distance of the previous return route exceeds a preset value (step 206). Similar to the case of a detour route described earlier, in this embodiment, the preset value is 25% by default, and it is determined whether the ratio of the previous return route to the total distance to be traveled when the vehicle returns to the initial route via the previous return route and travels to the destination exceeds 25%.

Similar to the case of a detour route, the user is allowed to arbitrarily change the preset value within a predetermined range (e.g., 0% to 100%) using the remote control unit 4. For example, if the user personally feels that the default value of 25% is inappropriate, the user is allowed to change the value of ratio as desired.

If it is determined in step 206 that the ratio of the current return route does not exceed the preset value, the procedure returns to step 201, searching for a new return route that is different from the current return route.

If it is determined in step 206 that the ratio of the distance of the current return route exceeds the preset value, the route search processing unit 28 searches again for a route that links the current position of the vehicle and the destination at an optimal cost (step 207). A route that has thus been found is newly set as an initial route. The procedure then returns to step 200, repeating the subsequent processes.

Figure 9:
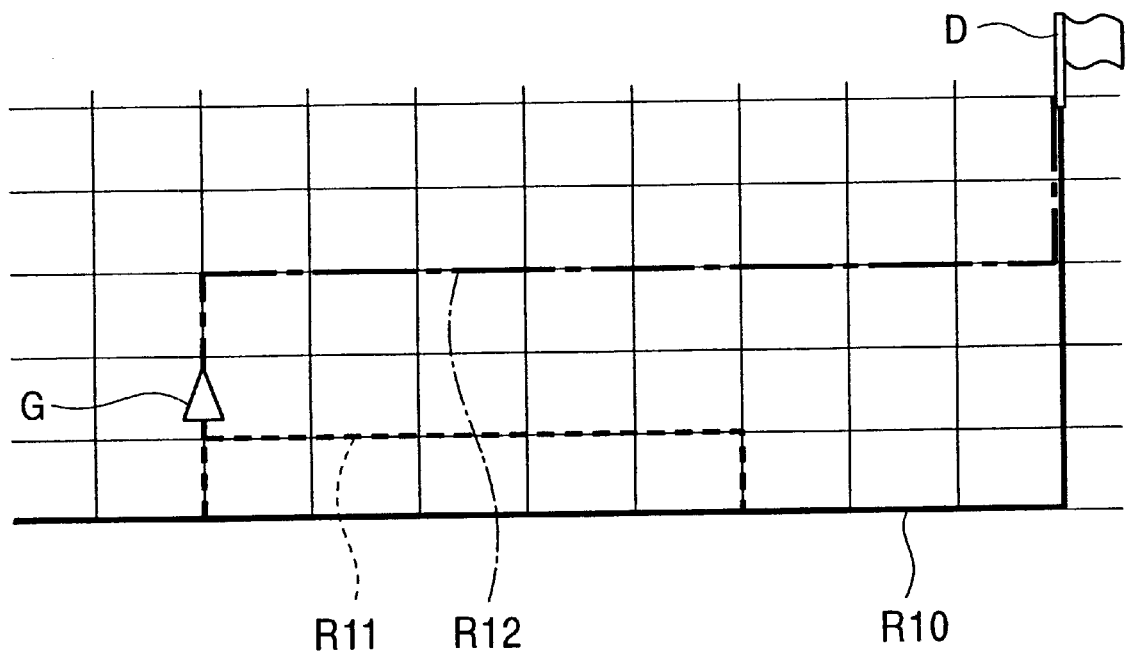
FIG. 9 is an illustration of the processes in steps 206 and 207.
Figure 10A:
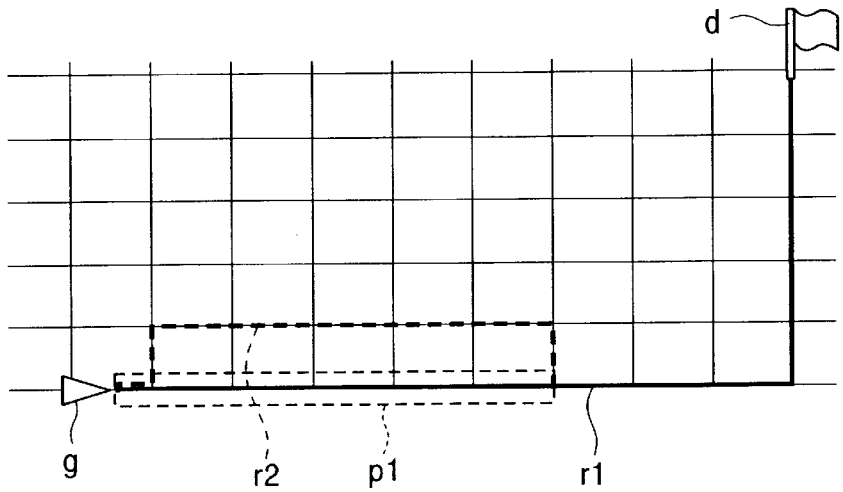
FIGS. 10A to 10C are diagrams showing an example where an inappropriate detour route is set in a conventional navigation apparatus.
Figure 10B:
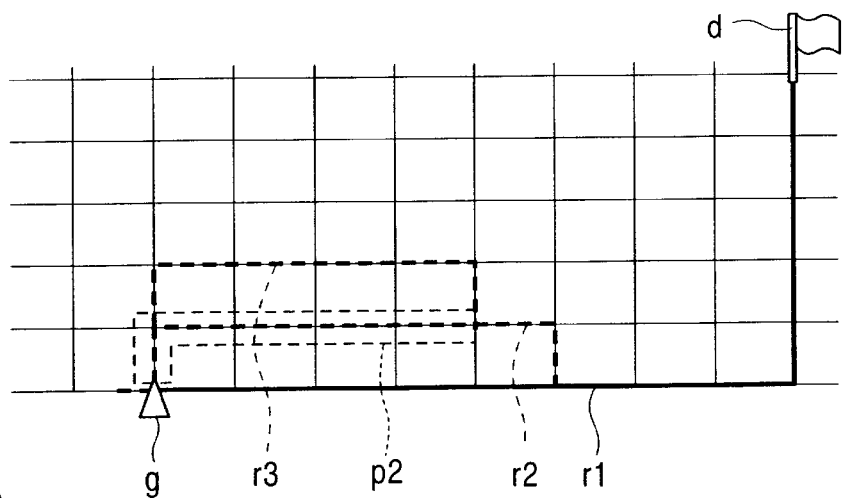
Figure 10C:
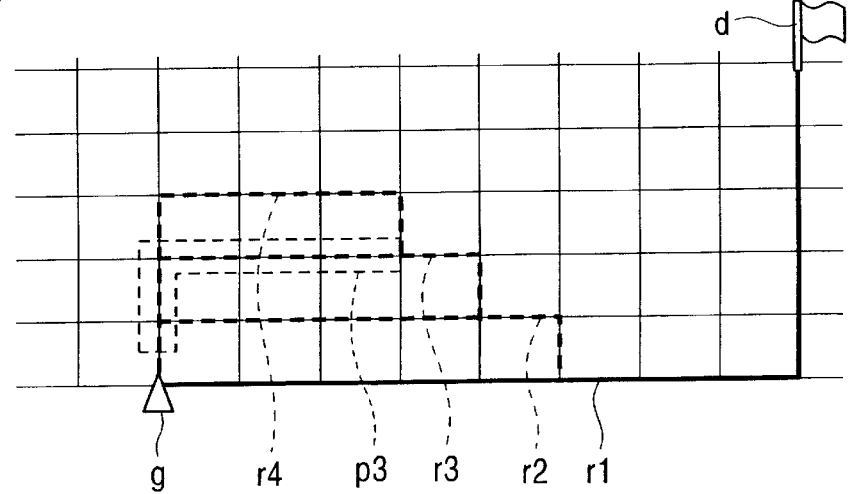

FIG. 9 is a diagram showing the processes in steps 206 and 207. As an example, a case is shown where a return route R11 associated with an initial route R10 has already been found and the current position G of the vehicle is off the return route R11. As shown in FIG. 9, because the ratio of the distance of the return route R11 to the total distance to be traveled when the vehicle returns to the initial route R10 via the return route R11 and travels to the destination D exceeds the preset value of 25%, the route search processing unit 28 searches for a new route R12 that links the current position G of the vehicle and the destination D at an optimal cost.

As described above, in the navigation apparatus according to this embodiment, when a second or subsequent calculation of a detour route is instructed, the cost of a link corresponding to the entire previous detour route is increased, and a new detour route for returning to an initial route is searched for, so that the selection of a detour route that returns to a previous detour route is prevented as much as possible. Accordingly, the selection of an inappropriate, very lengthy route is prevented even if a detour route is searched for a plurality of times. Furthermore, when a second or subsequent calculation of a detour route is instructed and if a ratio of the distance of a previous detour route exceeds a preset value, that is, if the detour route is too long, a route from the current position of the vehicle to a destination is searched for again, so that an appropriate route with a shorter distance, shorter travel time, etc. is found.

Furthermore, in the navigation apparatus according to this embodiment, when a second or subsequent calculation of a return route is instructed and if a ratio of a return route that has previously been found exceeds a preset value, a route to the destination is searched for again. Accordingly, the selection of an inappropriate, very lengthy route is prevented even if the vehicle repeatedly turns off a return route.

The present invention is not limited to the embodiment described above, and various modifications are possible within the scope of the present invention. For example, in the embodiment described above, whether to search again for a route to a destination instead of searching for a detour route is determined based on whether the ratio of the distance of a previous detour route to the total distance to be traveled when the vehicle returns to an initial route via the previous detour route and travels to the destination exceeds a preset value; however, a ratio of the distance of a detour route may be calculated in different ways.

For example, the ratio may be a ratio of the distance of the previous detour route to the total distance to be traveled when the vehicle travels from the current position to the destination along the initial route. In that case, it is determined what percentage of the total distance to be traveled along the initial route as originally planned is represented by the detour route, so that whether the detour route is lengthy can be accurately evaluated, similar to the embodiment described above.

Alternatively, the ratio may be the ratio of the distance of the previous detour route to the straight line distance from the current position of the vehicle to the destination. The straight line distance from the current position of the vehicle to the destination can be readily calculated based on the respective latitudes and longitudes of the current position of the vehicle and the destination. By calculating the ratio as such, whether the detour route is too long can be approximately evaluated and, advantageously, processing is simplified.

Also, in determining whether to re-search a route to the destination instead of searching for a return route, a ratio of the distance of a return route can be calculated in the same manner as in the modifications described above.

More specifically, the ratio may be the ratio of the distance of the previous return route to the total distance to be traveled when the vehicle travels from the current position to the destination along the initial route. In that case, it is determined what percentage of the total distance to be traveled along the initial route as originally planned is represented by the return route, so that whether the return route is too long can be accurately determined, similar to the embodiment described above.

Alternatively, the ratio may be the ratio of the distance of the previous return route to the straight line distance from the current position of the vehicle to the destination. By calculating the ratio as such, whether the return route is too long can be approximately evaluated. Furthermore, since the straight line distance from the current position of the vehicle and the destination can be readily calculated as described above, advantageously, processing is simplified.

Furthermore, although a detour distance may be set by selecting one of a plurality of operation buttons as shown in FIG. 3 in the embodiment described above, a user may be allowed to arbitrarily specify a detour distance.

Furthermore, although the cost of a link corresponding to a detour segment is weighted by multiplying the inherent cost preset for each link by a detour cost coefficient in accordance with a type of road in the embodiment described above, the cost may be weighted by various other methods. For example, the weighting may be such that the length of a link to be weighted, i.e., the distance of a road corresponding to the link, is multiplied by a predetermined value and the result of the multiplication is added to the inherent cost of the link.

What is claimed is:

1. A navigation apparatus comprising:
   destination setting means for setting a destination;
   route searching means for searching for an initial route to the destination set by said destination setting means, under a given condition;
   detour calculation instruction means for instructing the calculation of a detour route; and
   detour route searching means for searching for a detour route for returning to the initial route;
   wherein when an instruction for a first calculation of a detour route is issued by said detour calculation instruction means with a detour distance along said initial route specified, said detour route searching means searches for a detour route while increasing the cost of a link corresponding to the detour distance specified by said detour calculation instruction means, whereas when an instruction for a second or subsequent calculation of a detour route is issued, said detour route searching means searches for a detour route after increasing the cost of each link corresponding to a detour route that has been found according to a previous instruction for the calculation of a detour route.

2. A navigation apparatus according to claim 1, further comprising route re-searching means for searching again for a route to the destination set by said destination setting means when an instruction for a second or subsequent calculation of a detour route is issued and if a ratio of a distance of a detour route found by said detour route searching means exceeds a preset value.

3. A navigation apparatus according to claim 1 or 2, further comprising instruction screen display means for displaying an instruction screen, the instruction screen including a first area for selecting one of a plurality of candidates of detour distance and for instructing the calculation of a detour route, and a second area for instructing the calculation of a detour route without specifying a detour distance,
   wherein, when the second area included in the instruction screen is specified by said detour calculation instruction means, said detour route searching means searches for a detour route as though a second or subsequent calculation of a detour route has been instructed.

4. A navigation apparatus according to claim 3, wherein said instruction screen display means prohibits the selection of a candidate of detour distance, included in the first area, that has already been selected in a state where an instruction for a second or subsequent calculation of a detour route is allowed.

5. A navigation apparatus according to claim 1, further comprising vehicle position detecting means for detecting a current position of a vehicle, wherein, when a second or subsequent calculation of a detour route is instructed, said detour route searching means sequentially tracks each detour route that has been found according to a previous instruction for the calculation of a detour route from the current position of the vehicle to the initial route before executing a search for a detour route according to the instruction for a second or subsequent calculation of a detour route, and increases the cost of each link that constitutes each detour route that has been tracked.

6. A navigation apparatus according to claim 5, wherein said detour route searching means increases the cost of each link by multiplying the original cost thereof by a multiplier value, the multiplier value increasing in order of a detour route including the link being a minor street, a main road, and a highway.

7. A navigation apparatus according to claim 2, wherein the ratio is a ratio of a distance of a previous detour route found by a previous search for a detour route by said detour route searching means to a total distance to be traveled when the vehicle returns to the initial route via the previous detour route and travels to the destination.

8. A navigation apparatus according to claim 2, wherein the ratio is a ratio of a distance of a previous detour route to a total distance to be traveled when the vehicle travels from a current position to the destination along the initial route.

9. A navigation apparatus according to claim 2, wherein the ratio is a ratio of a distance of a previous detour route to a straight line distance from a current position of the vehicle to the destination.

10. A navigation apparatus according to claim 2, further comprising a ratio setting means for arbitrarily setting the ratio within a predetermined range.

11. A navigation apparatus comprising:
vehicle position detecting means for detecting a current position of a vehicle;
destination setting means for setting a destination;
route searching means for searching for an initial route to the destination set by said destination setting means, under a given condition;
recalculation instruction means for determining whether the current position of the vehicle detected by said vehicle position detecting means is off the initial route found by said route searching means, and for instructing the recalculation of a route if the current position of the vehicle is determined to be off the initial route; and
return route searching means for searching for a return route;
wherein, when a first recalculation is instructed by said recalculation instruction means, said return route searching means searches for a return route for returning to the initial route found by said route searching means, whereas when a second or subsequent recalculation is instructed, said return route searching means searches again for a route to the destination if a ratio of a return route that has previously been found exceeds a preset value while searching for a different return route for returning to the initial route if the ratio does not exceed the preset value.

12. A navigation apparatus according to claim 11, wherein said return route searching means searches for a different return route for returning to the initial route until recalculation is instructed more than a predetermined number of times by said recalculation instruction means.

13. A navigation apparatus according to claim 11 or 12, wherein the ratio is a ratio of a distance of a previous return route found by a previous search for a return route by said return route searching means to a total distance to be traveled when the vehicle returns to the initial route via the previous return route and travels to the destination.

14. A navigation apparatus according to claim 11 or 12, wherein the ratio is a ratio of a distance of a previous return route to a total distance to be traveled when the vehicle travels from a current position to the destination along the initial route.

15. A navigation apparatus according to claim 11, wherein the ratio is a ratio of a distance of a previous return route to a straight line distance from a current position of the vehicle to the destination.

16. A navigation apparatus according to claim 11 or 12, further comprising a ratio setting means for arbitrarily setting the ratio within a predetermined range.

17. A method of operating a navigation apparatus for a vehicle, comprising:
setting a destination;
searching for an initial route to the destination; and
searching for a detour route around a portion of the initial route;
wherein, when a second or subsequent request for the calculation of a detour route is issued under predetermined conditions, a further detour route is searched for after increasing the costs of links corresponding to a previously searched detour route.

18. A method according to claim 17, wherein the predetermined conditions include at least one of that the vehicle had been traveling on a previously searched detour route, and that a request for a detour route is repeated in a predetermined short period.

19. A method according to claim 17, wherein when a second or subsequent request for the calculation of a detour route is issued, a route to the destination is searched for again if a ratio of a distance of a previous detour route to a total distance to be traveled from a starting point to the destination exceeds a preset value.

20. A method according to claim 19, wherein the total distance to be traveled to the destination is one of a distance along the initial route, a distance when the vehicle returns to the initial route via a previous detour route, and a straight line distance.

21. A method according to claim 17, wherein the costs of links corresponding to a previously searched detour route are increased by multiplying the original cost of each link by a multiplier value, the multiplier value varying in accordance with the type of road corresponding to the link.

22. A method of operating a navigation apparatus for a vehicle, comprising:
setting a destination;
searching for an initial route to the destination; and
searching for a return route when the vehicle is off the initial route;
wherein, when a second or subsequent request for the calculation of a return route is issued, either a route to the destination or a different return route for returning to the initial route is searched according to preset value.

23. A method according to claim 22, wherein the preset value is one of a ratio of a distance of a previous return route to a total distance to be traveled from a starting point to the destination, and a number of times a request for the calculation of a return route is issued.

24. A method according to claim 23, wherein, in calculating the ratio, the total distance to be traveled to the destination is one of a distance along the initial route, a distance when the vehicle returns to the initial route via a previous return route, and a straight line distance to the destination.

* * * * *